Sept. 15, 1970    TEIICHI NOGUCHI ETAL    3,528,544
METHOD FOR INSPECTING LIQUIDS FOR DETECTION
OF FOREIGN SOLID MATTERS
Filed Sept. 19, 1968    5 Sheets-Sheet 1

TEIICHI NOGUCHI,
KIMISHIGE ONOZATO,
IKUJI INOWAKI AND
TOSHIO TAKAHASHI,

INVENTORS

BY *Wendroth, Lind & Ponack*

ATTORNEYS

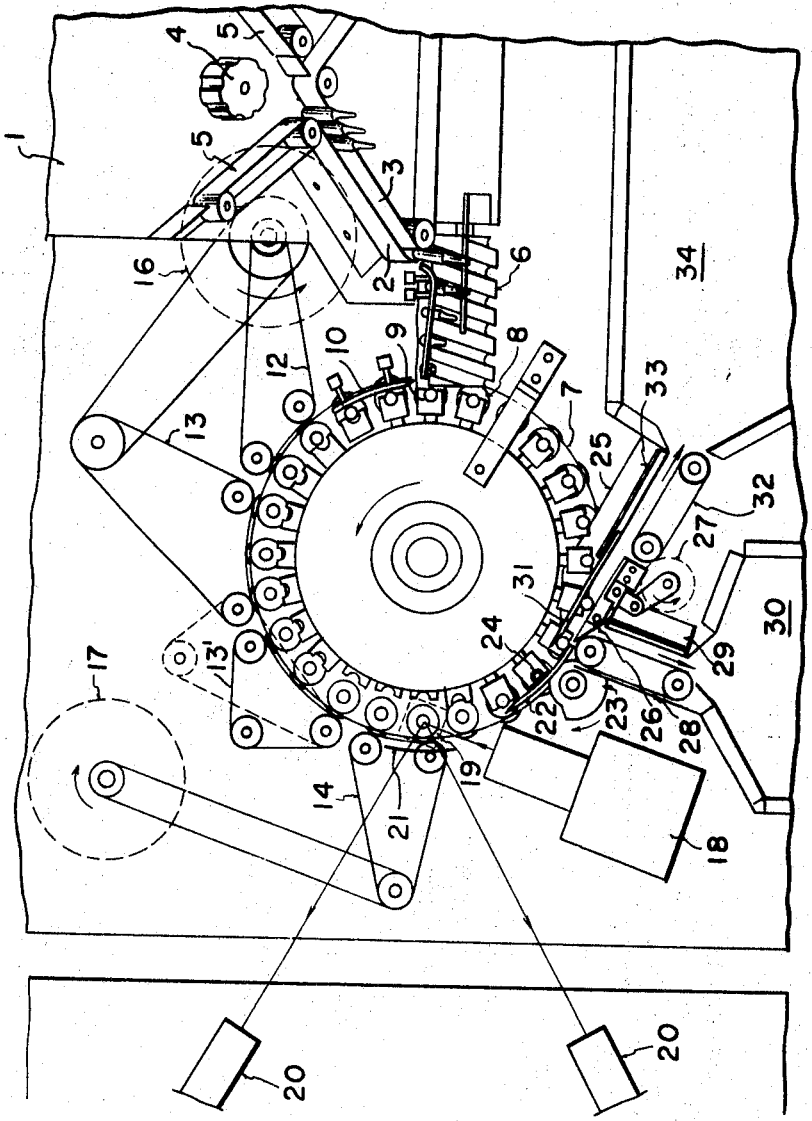

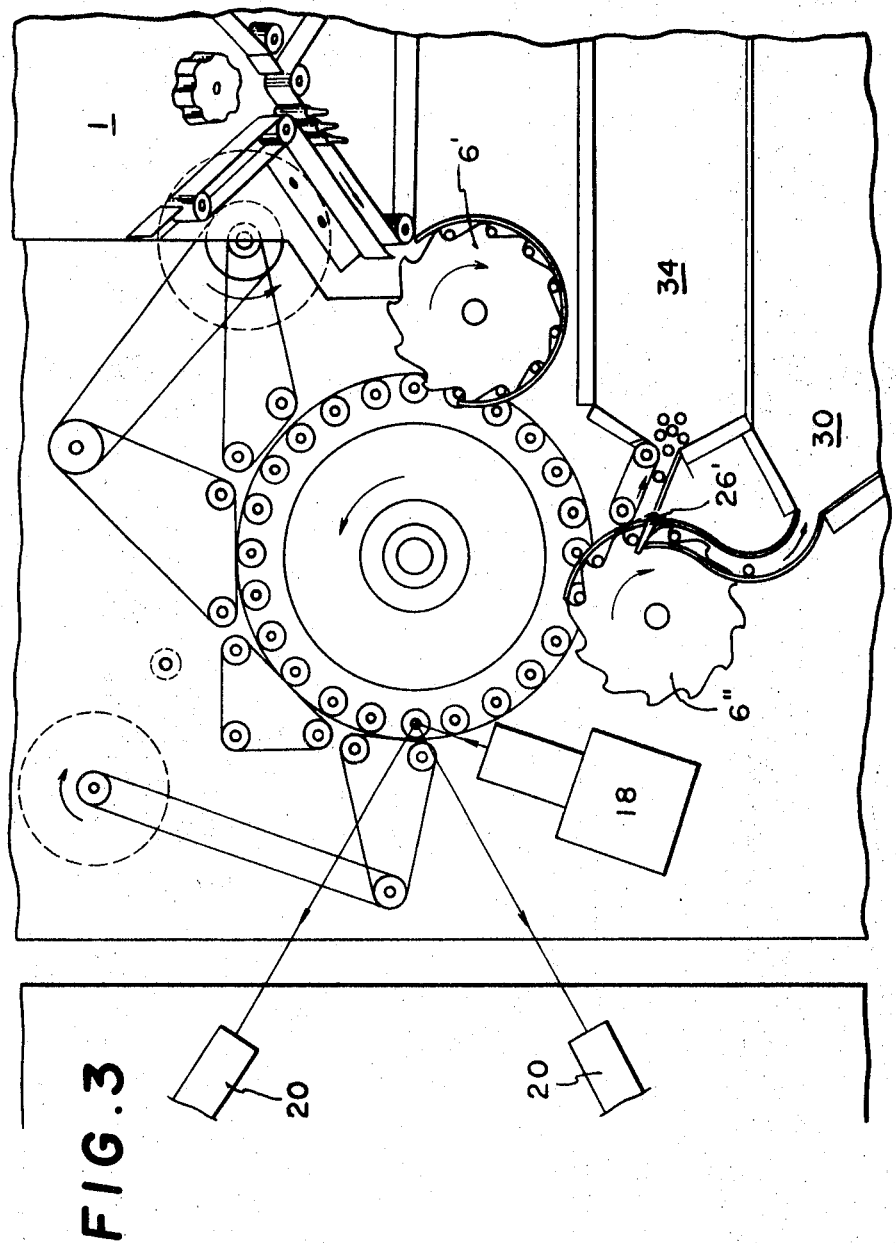

Sept. 15, 1970 TEIICHI NOGUCHI ETAL 3,528,544
METHOD FOR INSPECTING LIQUIDS FOR DETECTION
OF FOREIGN SOLID MATTERS
Filed Sept. 19, 1968 5 Sheets-Sheet 4
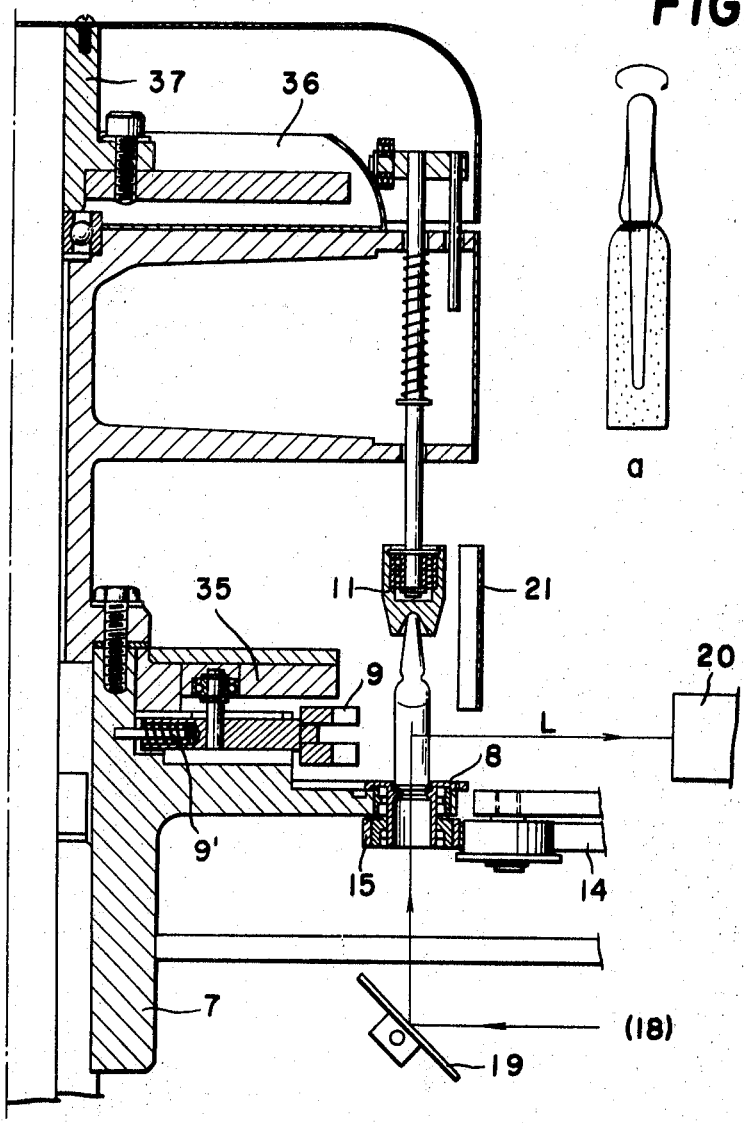
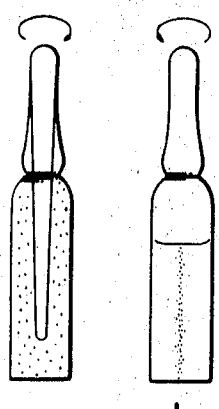
TEIICHI NOGUCHI,
KIMISHIGE ONOZATO,
IKUJI INOWAKI AND
TOSHIO TAKAHASHI, INVENTORS
BY Wenderoth, Lind & Ponack
ATTORNEYS

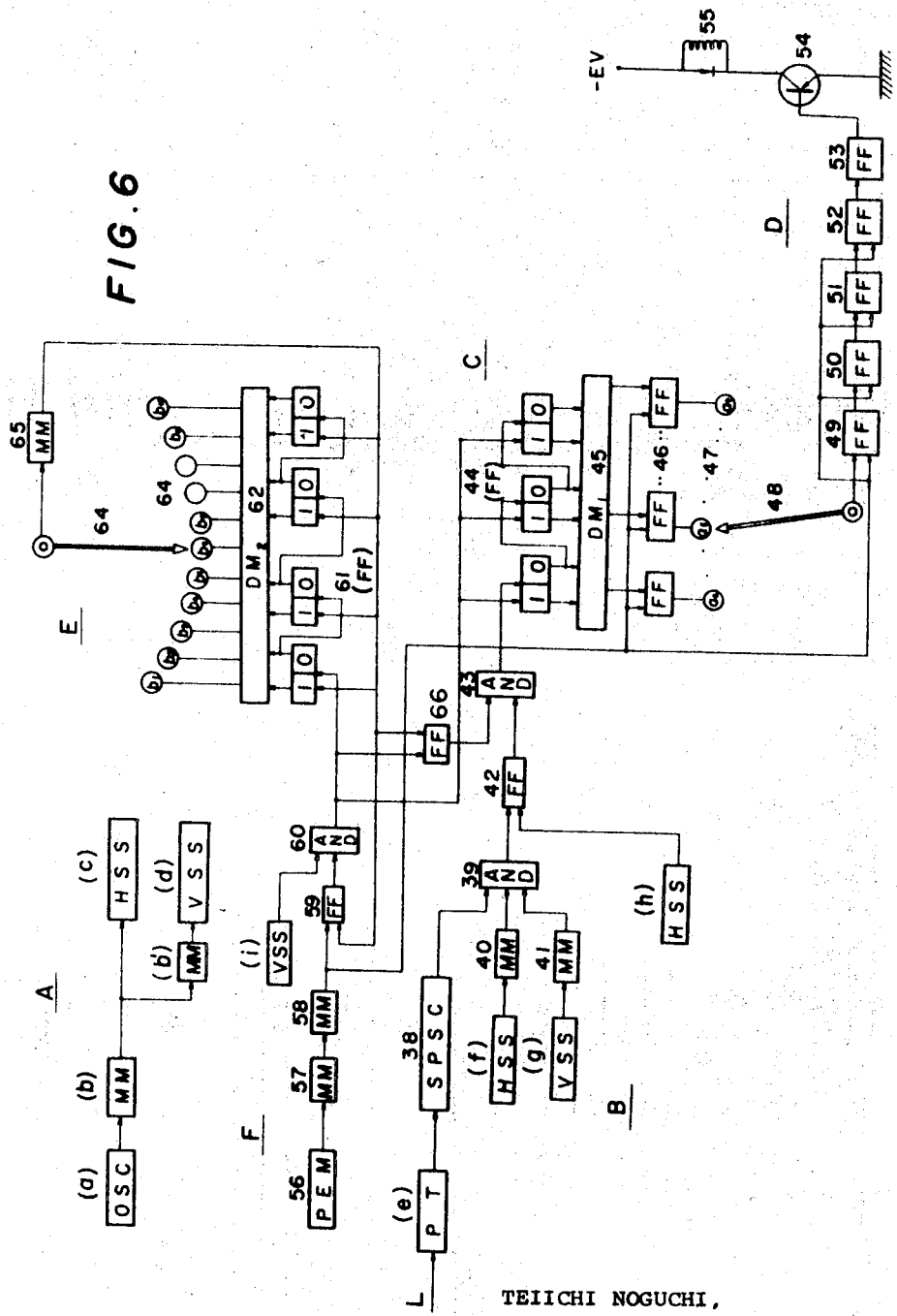

United States Patent Office 3,528,544
Patented Sept. 15, 1970

3,528,544
METHOD FOR INSPECTING LIQUIDS FOR DETECTION OF FOREIGN SOLID MATTERS
Teiichi Noguchi and Kimishige Onozato, Saitama Prefecture, Ikuji Inowaki, Gumma Prefecture, and Toshio Takahashi, Saitama Prefecture, Japan, assignors to Eisai Kabushiki Kaisha, Tokyo, Japan
Filed Sept. 19, 1968, Ser. No. 760,901
Claims priority, application Japan, Oct. 2, 1967, 42/63,037; Aug. 3, 1968, 43/54,637
Int. Cl. B07c 3/14
U.S. Cl. 209—73      4 Claims

ABSTRACT OF THE DISCLOSURE

This invention provides an automatic method for inspecting a liquid filled in transparent vessels such as ampoules for medical treatment and sorting the vessels depending upon the contents of foreign solid matters which may present therein as impurity, and an apparatus therefor. The invention involves three essential points:

The first of which is to concentrate in a columnar form of foreign solid matters, if any, at the axial center of the vessels by combined mechanical rotations in normal and then reverse directions; the second is to inspect the foreign solid matters by optical and electrical means; and the third is to sort the vessels into conforming and non-conforming ones according to the number and/or sizes of the foreign solid matters as detected.

---

This invention relates to a method for automatically inspecting a liquid filled in transparent vessels such as ampoules for the presence of any foreign solid matter and an apparatus therefor.

The term "a liquid filled in transparent vessels" herein and in the claims referred to is meant by the colorless or colored transparent vessels containing a colored or water-white liquid.

Heretofore the inspection of this type of object for impurities has been carried out visually. To be more exact, it has been customary to put the objects of inspection, such as ampoules for medical treatment, for example, upside down one by one, and carefully observe each ampoule through a magnifying glass under suitable illumination to see if any foreign solid matters in the liquid contained in the vessel is caused to sink or float thereby, and then reject any such ampoule that is found unacceptable upon certain definite criteria. Such manual procedure limits the inspection capacity of the inspector, gives more or less different results among the inspectors, and may often cause overlooking of foreign contents in the products. The last-mentioned disadvantage of manual inspection is particularly manifest in the inspection of foreign matters such as glass particles which may float close to the inner wall of ampoule, because they can hardly be detected from the outside. With the view to solving this problem, arrangements have been proposed in which part of the mechanism, for example, for the displacement and tumbling of vessels and discharge of defective ones out of the line, is automatized. However, there has been realized no automatic liquid inspection apparatus in which the entire steps for liquid inspection are completely automatized. This is because all of the prior attempts have failed to attain desired results, specifically in respect to dependability.

The present invention is therefore directed to provision of a completely automatic apparatus for inspection of liquid held in vessels which precludes any possibility of overlooking, has increased dependability, permits a suitable choice of level for inspection accuracy, and possesses a capacity from several to several ten times those of conventional techniques.

The present invention is featured by an arrangement whereby a high-speed rotation of the order of 3,000 r.p.m., for example, is imparted to transparent vessels such as ampoules, and then, immediately before an optical inspection, the vessels are reversely rotated at a slow speed, say 600 r.p.m., so that the concaved liquid level in each ampoule under rapid rotation is quickly brought back to the original level, and at the same time the impurities in the liquid held in the ampoules, if any, can be caused to float up in a columnar form at the central zone of liquid as it is involved in the vortices in the individual ampoules, thus, foreign solid matters even though glass chips probably present in the liquid is accumulated in a columnar form at the axial center of each ampoule and is easily detected through optical means. Further, the low-speed rotation which is carried on during the optical inspection eliminates the effects of scratches, flaws, stains, and any other defects of the vessel walls and hence avoids any errors in inspection which may otherwise result therefrom.

The present invention will be more fully described in connection with a preferred embodiment thereof illustrated in the accompanying drawings.

In the drawings showing an automatic liquid inspection apparatus as typical one according to the present invention, as applied to the inspection of a solution held in ampoules.

FIG. 2 is a top plan view showing the mechanism of the apparatus,

FIG. 3 is a top plan view showing another mechanism of the apparatus,

Figure 7:
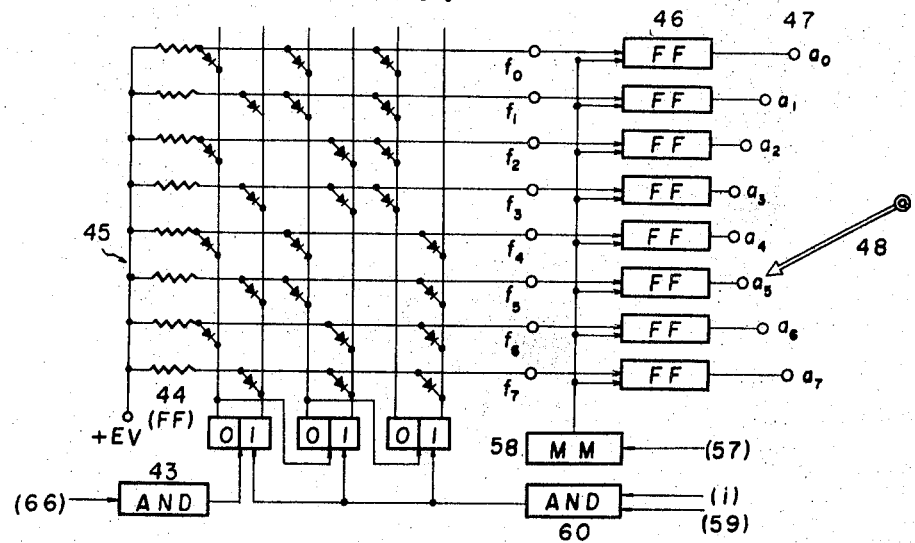

FIG. 4 is a partial section of enlarged front elevational view of the turret assembly of the apparatus, FIG. 5 is a front elevational view of an ampoule showing the status of liquid level therein caused by rotations of the ampoule, FIG. 6 is a concerted block diagram explanatory of associated mechanism for the electrical circuits as one typical method for counting through pulse signals the number and/or sizes of the images of the detected foreign solid matters and sorting the vesesls according to the results and FIG. 7 is a block diagram explanatory in detail of part of the diagram of FIG. 6.

The apparatus according to the present invention generally comprises an assembly of four different means, namely, feeding means for the transparent vessels such as ampoules, turret means, optical inspection means, and vessel delivery means for sorting or picking out the detected non-conforming vessels.

The feeding means consist of a vessel feed hopper 1, guide 2, belt 3, grooved wheel 4 if desired, belts 5, and feed screw 6 or feed star-wheel 6'.

Figure 1:
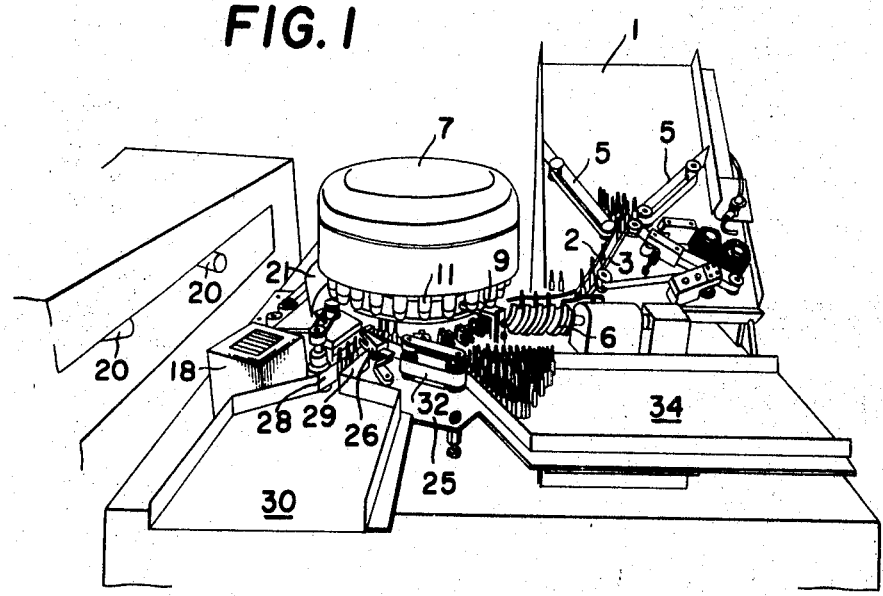
FIG. 1 is a perspective view of the essential part of the apparatus.

Ampoules, for example, supplied to the vessel feed hopper 1 are caused to slide down by their own weight due to the inclination of the feed hopper. At the lowermost end of the hopper, the ampoules are arranged by guide 2 and combined cleaning and feeding belt 3 to proceed in a line therebetween. Any crystals, stains, etc., that may be deposited on the external surfaces of the ampoules are wiped off by this belt 3 as the ampoules are fed out. Grooved wheel 4, optionally provided, and belts 5 serve to counteract the bridging action of ampoules lest the latter should form a bridge at the inlet of guide 2 and belt 3 thereby to interrupt smooth feeding of the ampoules. As shown in FIGS. 1 and 2, the ampoules fed in a row in this way are then carried intermittently by feed screw 6 onto turntables 8 of intermittently rotating turret 7.

The turret means consists of turret 7 which slowly and intermittently rotates together with a multiplicity of turntables 8 arranged along the periphery thereof for supporting a corresponding number of ampoules, high-speed driving belts 12, 13 and 13' disposed along the circumference of turret for rotating and accelerating turntables 8 stage by stage, and belt 14 disposed next said belts that reversely rotates said turntables 8 at a low speed.

Ampoules are supported on centers of individual turntables by means of cells 9, and are moved simultaneously with the rotating turret while being held in position by guides 10. As the ampoules in a row proceed, caps 11 come down to press top of each ampoule by spring force and hold them securely lest the ampoules should slip off their turntables 8. Each turntable 8 at its center has a hole substantially of the same diameter as that of the ampoule, and is provided with a rubber ring such as O-ring near the top surface so as to support the bottom periphery of each ampoule. The portion to fit the periphery near the bottom of ampoules keeps the ampoules against jumping outwardly due to their rotations and permits the ampoules to rotate in stabilized manner as will be described later. Ampoules of different sizes can be inspected on this apparatus by simply replacing said rubber rings and cells by those of suitable dimensions.

As the ampoules are further moved ahead from the fed positions by the rotation of turret, cells 9 as shown in FIG. 4 are caused to recede toward the center of turret by means of plate cam 35 and then driving belts 12, 13, 13' and 14 arranged along the circumference of turret come into contact with wheels 15 of turntables thereby rotating turntables 8 together with ampoules thereon. Variable speed motors 16, 17 drive the ampoules. Since the ampoules should be rotated at a high-speed, for example, of the order of 3,000 r.p.m. belt 12 first gives a preliminary rotation to the ampoules, and then the ampoule speed is accelerated by belts 13 and 13' to a high-speed as desired. When such high-speed was attained, the ampoules are caused to rotate reversely at a low speed, for example, of 600 r.p.m. by belt 14.

In another embodiment of feed means shown in FIG. 3 in which star-wheel 6' associated with another star-wheel 6" for derivary means is arranged in lieu of screw 6 in FIGS. 1 and 2, ampoules fed in a row are carried consecutively onto the centers of turntables 8 of continuously rotating turret 7, when cap 11 comes down to press top of each ampoule by spring force to hold securely the ampoule without the aid of movable cells 9 which are necessary for the case in which screw 6 is employed in the feeder as aforementioned. The structure and mechanism of the apparatus are thus simplified extremely.

During the high-speed rotation the liquid inside the ampoules are swirled centrifugally to form a liquid level configuration as shown in FIG. 5a. That is to say, the centrifugal force urges the liquid in each ampoule up to the upper portion of the vessel while causing the liquid level in the center to drop to an extremely low level. Bubbles, if any, in the liquid would be driven off in this course of rotation. As this rotation is then taken over by the reverse rotation, the liquid level quickly returns to the original height as shown in FIG. 5b. The liquid portion along the inner wall of ampoule tends to follow this reverse rotation but, toward the axial center of the ampoule, the effect of preceding high-speed rotation still remains with the result that a centripetal vortex is produced. Foreign solid matters are involved in this vortex and rise up along the axis thereby forming a columnar concentric zone of foreign matters. Because of the drastic change of flow due to the reverse rotation, the resulting vortex is so intensified though for a relatively limited period of time that impurities of fairly large particle sizes can well be urged upward through the axial center of each ampoule. It is at this stage that the liquid is subjected to an optical inspection as now to be described.

The optical inspection means consist of a light source system 18 disposed at a suitable position such as below the bottom of ampoule to be inspected and a photo-inspection system 20 arranged alongside the ampoule. A light beam from a light source may extend from the bottom of ampoule, for example, upwardly through the axial center. As the light beam advances upwardly by the aid of mirror 19, through the center where a column of foreign solid matters can swirl up, the light is irregularly reflected by the foreign matters, if any. Any such irregular reflection is caught up by the photo-inspection system 20 alongside the ampoule, i.e., by photocell, phototransistor, secondary electron multiplier, optical pickup tube, etc. The light beam thus caught up by a pickup tube, for example, is further treated through electronic means as will exemplarily be illustrated later to give off a discriminating signal indicating whether the ampoule is conforming or non-conforming. Mask 21 is provided to avoid reflection of the liquid level.

The ampoule delivery means consists of separate sections for discharging conforming and non-conforming articles. As an ampoule advances past the inspection point, cell 9 moves outward by the aid of the spring 9' and the ampoule is carried forward while being held between the cell and guide 22 which is located along the circumference of turret and at a point where the turret has further rotated. At this point the cap ascends. The cap is raised by cylindrical cam 36 in FIG. 4, which is supported by a fixed shaft 37 in the center of turret. Next, on turning plate 23 the ampoule is urged upward from the seat of said plate through a hole thereof by means of push-up rod 24. Thus, the periphery of turning plate comes below the ampoule to provide a support therefor. Further rotation of turret carries the ampoule over to plate 25. Shutter 26 is swung by a rotary solenoid 27, for example, to sort the inspected ampoules into conforming and non-conforming groups. Upon arrival of any defective ampoule at this position, a non-conforming signal memorized beforehand preferably by means of an electronic mechanism is given off to excite the rotary solenoid, which in turn actuates the shutter so that the ampoule is discharged by belt 28 and sponged guide 29 into a compartment 30 for defectives. On the other hand, conforming ampoules are carried forward by the shutter in reset condition and guide 31, and is further squeezed between belt 32 and sponged guide 33 for compulsory discharge into a compartment 34 for non-defectives.

Again, when star-wheel 6' is provided in the feed system as shown in FIG. 3 and accordingly the inspecting operation is effected without intermittence of the rotation of turret, the selective separation of conforming and non-conforming ampoules is carried out in a simple manner by means of star-wheel 6" and shutter 26', the former having shape just like star-wheel 6' with elimination of the cell 9 as in the case the screw member 6 is provided in the feed system.

The present invention is characterized by a combination of high-speed rotation and reverse rotation which are imparted by turn to vessels such as ampoules. The advantages derivable from the reverse rotation of vessels are as noted below.

(1) Swirling liquid level is quickly brought back to the original level. While it is a general tendency with small-diameter ampoules that, after a high-speed rotation part of the liquid is trapped in the head of each ampoule and fails to return to the main vessel body, the reverse rotation can simply reset and stabilize the liquid level in each ampoule. Unless the original liquid level is resumed, reflection of liquid level during subsequent optical inspection may lead to erroneous operation of the instrument.

(2) Foreign solid matters are aided in floating up. If an ampoule is rotated and then stopped without being followed by the reverse rotation, the vortex which remains in the vessel will not be vigorous enough, even after a high-speed rotation, to float up large particles such as glass chips to a detectable extent. Acccording to the present invention, the combination of high-speed and low-speed rotations produces a sufficiently vigorous centripetal vortex to swirl up solid impurities of even fairly large particle sizes.

(3) Scratches and other flaws and stains on tubular walls of vessels are made negligible for inspection purpose. Since ampoules are inspected while being rotated at a low speed, any scratch or other flaw or strain which may be formed or deposited on the ampoule wall is rendered substantially invisible and is kept from causing any erroneous operation of the instrument. In ampoules the impurities which may gain entrance during the course of manufacture include fibers of filter paper, glass chips, flakes, crystals, degenerated products, and other wastes. When swirled up, they float up in different ways, and some are readily detected while the others are not. Thus, there are some variations in the floating conditions, but a satisfactory inspection condition can be attained for particular ampoules and solid impurities which may be present therein, through selection of a suitable combination of r.p.m.'s for high-speed and low-speed rotations, periods of time for such rotations, timing for initiating the reverse rotation, etc.

As one typical embodiment, the entire system of counting number and/or sizes of foreign solid substances in the vessels such as ampoules through an optical image pickup tube associated with a sorting system of conforming and non-conforming ampoules by means of electronic mechanisms will be illustrated in detail along with FIGS. 6 and 7 of the accompanying drawings.

The systems shown by way of a concerted block diagram consist essentially of an assembly of the following units:

(a) A synchronizing signal generating circuit for supplying horizontal and vertical synchronizing signals to an optical pickup tube, (b) A circuit for converting the output signal from the pickup tube into a definite pulse signal, (c) A circuit for counting the number of definite pulse signals, (d) A circuit for exciting a certain device such as solenoid coil according to the number of pulse signals counted, (e) A detection time setting circuit for setting the width of signal gate, and (f) A photoelectric circuit system.

Throughout these block diagrams, the symbols denote respectively:

AND: AND circuit,
DM: Diode matrix,
FF: Flip-flop element,
HSS: Horizontal synchronizing signal,
VSS: Vertical synchronizing signal,
PI: Pickup tube,
L: Flux of light reflected,
MM: Monostable multivibrator,
OSC: Oscillator,
PEM: Photoelectric means,
SPSC: Shaped definite pulse signal circuit.

Further, in FIGS. 6 and 7, like numerals represent like parts.

The circuit system A in FIG. 6 for generating synchronizing signal divides signals from an oscillator ($a$) such as quartz oscillator by means of monostable multivibrator ($b$), for example, into a horizontal synchronizing signal ($c$) having a frequency of $1/15 \times 10^3$ sec., for example, and a vertical synchronizing signal ($d$) having a frequency of 1/57.1 sec., for example, and feeds the signals as synchronizing inputs to pickup tube ($e$) in system B of FIG. 6 for discriminating number of solid foreign matters in liquid filled in a transparent vessel. Output signal obtained from pickup tube ($e$) of camera that has caught the flux of light L reflected from the solid particles in the vessel is led through circuit system 38 for conversion into a shaped definite pulse signal. This signal is applied, together with a horizontal synchronizing signal ($f$) and vertical synchronizing signal ($g$) obtained respectively from ($c$) and ($d$) to AND circuit 39 through 40 and 41.

The horizontal synchronizing signal ($b$) is a pulse signal of rectangular waveform having, for example, a width of 10 $\mu$s. and a frequency of $1/15 \times 10^3$ sec., and the vertical synchronizing signal ($g$) is a pulse signal of rectangular waveform having, for example, a width of 10 $\mu$s. and a frequency of 1.57.1 sec. Since they are applied to AND circuit 39 through monostable multivibrators 40 and 41, their lateral width for horizontal scanning from 38 and their vertical width for vertical scanning from 38 can be cut off to desired values by varying the widths of said rectangular shaped pulses by means of 40 and 41. It is thus possible to use any desired portion of the definite pulse signal as the output of AND circuit 39. The output signal of AND circuit 39 is applied to flip-flop 42, to which is also applied a horizontal synchronizing signal ($h$) obtained from ($c$) as reset signal. As the output from flip-flop 42 and an output obtained by passing the output of a separate circuit system E for detection timesetting through flip-flop 66 are applied to the signal gate of AND circuit 43, a definite pulse signal represnting the value relative to the foreign solid matters passing the gate emerges as an output signal. This output pulse signal is then sent to a circuit system C for signal counting, where the number of pulses by fields is counted and the maximum pulse value is memorized, for example, by eight flip-flops 46. Only when the memorized number of pulses exceeds a certain preset value, it emerges as an output signal on terminal 48.

Pulse counting circuit system C, as also shown more in detail in FIG. 7, consists of three flip-flops 44 connected in series and one diode matrix 41 ($DM_1$) which is an AND circuit from the outputs of the above flip-flops. First, the output signal from AND circuit 60 for the vertical synchronizing signal ($i$) obtained from ($d$) and also for photoelectric means 56 is applied as a reset signal for the repsective fields to the three flip-flops 44, which thus are all set to a state "000." If it is assumed that five definite pulse signals are applied as output from AND circuit 43 to flip-flops 44, then the three flip-flops 44 will be set to "101," and a positive potential will emerge only at the output terminals $f_0$–$f_5$ in FIG. 7, while the rest of terminals are all set to zero potential, and thus five pulse signals will be counted. Flip-flops 44 are reset for respective fields, and the output pulse of 43 is applied to the flip-flops 44 only during the periods of time corresponding to the number of fields preset by the detection time setting circuit system E, whereby the counting is continued during the above period of time.

This relationship will be further clarified by reference to FIG. 7. Output signals $f_0$–$f_7$ from the counting unit are applied to eight flip-flops 46

By the output signals from MM 57, 58 in FIG. 6, flip-flops are reset on each cycle of the intermittent or successive supplement of the vessels under inspection to the irradiating position as shown in FIGS. 2 and 3. Accordingly, flip-flops 46 memorize the maximum of values counted for the respective fields of solid impurity pulse signal that has passed through AND circuit 43 which serves as an open gate during the period of time preset by detection time setting circuit system E. Assuming now that a variable contact 48 is connected to the contact $a_5$ of output terminals 47 of flip-flops 46, then the output signal will always emerge at output terminal 48 through terminal $a_5$, even through an output emerges at a terminal, that is, at $a_6$, for example, beyond terminal $a_5$, as the signals will emerge the individual terminals of from $a_0$ to $a_6$ inclusive. This means that a signal exceeding the preset value 5 has been chosen.

The output pulse from variable contact 48 is applied to 49 among serially-connected flip-flops 49, 50, 51 and 53. These FF's are reset for each feeding cycle of the vessels at the irradiating position by the output of MM 58 which is a signal from photoelectric means 56 through 57. Accordingly, the signal applied to flip-flop 49 emerges as output of flip-flop 52 after four cycles of the irradiations above described and is applied to MM 53 thereby to set the pulse width. When the output of 53 is applied to the base of transistor of emitter ground amplifier circuit 54, the collector of 54 and solenoid coil 55 connected to −24 v. DC source, for example, are excited for the period of time corresponding to the width of input pulse. This exciting power is utilized to sort the vessels under inspection such as ampoules being intermittently or successively fed out one by one, according to the degree of solid contents of the individual vessels; the latter so sorted out being guided to their respective passages. In this way the purpose of sorting the vessels is achieved.

Photoelectric means 56 of the photoelectric circuit system F is so located that an output is generated from said means 56 as a fixed position signal of the vessel under inspection when the vessel has been fed to a predetermined inspection position at which the irradiations are effected periodically by the aid of a screen plate firmly mounted on a driving shaft which makes a complete rotation per cycle of the intermittent or successive feeding of the vessels. The fixed position signal of output from 56 is applied to the plurality of FF group 46 of the circuit system C and to FF group 49, 50, 51 and 52 of solenoid coil system D as reset signals after passage through MM 57 and MM 58 where the pulse rising point and pulse width are suitably set.

Description will then be made of detection time setting circuit E. The output signal obtained by applying the output from MM 58 to flip-flop 59 is applied together with the vertical synchronizing signal (i) to AND circuit 60. The output signal of 60 is applied as a reset signal to flip-flops 44 and is also applied to four serially-connected flip-flops 61. The output of flip-flops 61 is led to diode matrix 62 ($DM_2$) which is an AND circuit for accepting the outputs 61. If the variable contact 64 is set to a $b_n$ within a predetermined number of fields $b_1$, $b_2$, $b_3$ and so forth, a signal will then be generated from photoelectric means 56 and then output signals will emerge at the variable contact 64 at intervals of $b_n$ of the vertical synchronizing signals. Each of the output signals will emerge through MM 65 as a signal of a suitable pulse width, reset the four FF's 61 and FF 59, and further turn off the output of FF 66 which is set to the "on" position by the output of AND circuit 60. While this output signal is applied, together with the output of FF 42, to AND gate circuit 6, the gate 43 is kept open for the period of time that corresponds to the number of fields preset by the circuit system E.

While the present invention has been explained in detail in conjunction with a preferred embodiment thereof, it is to be appreciated that the present invention is not restricted to this particular embodiment but that numerous other modifications and alterations are possible without departing from the spirit of the invention.

What is claimed is:

1. Automatic liquid inspection method which comprises driving rotatable transparent vessels filled with a liquid to rotate at a high-speed in one direction and then suddenly switching the rotation of said vessels to a rotation in reverse direction and at a low speed, thereby bringing consecutively the concaved liquid level of the vessels quickly to the original level, and at the same time causing any foreign solid matters which may be present in said liquid to swirl up vigorously around the axial center of said vessel and further facilitating detection of any such foreign solid matters by virtue of a light beam leading to the central zone of the vessel.

2. Automatic liquid inspection apparatus comprising feed means for successively feeding rotatable transparent vessels filled with a liquid and automatically rearranging the vessels in such manner as to feed them one by one, slowly rotating turret means having a multiplicity of turntables arranged along the periphery of turret, said turntables being adapted to receive said transparent vessels which are intermittently or successively fed in from the feed means, drive means for rotating said turntables at a high-speed in one direction while said turret is turning, drive means located next said high-speed drive means and which is adapted to drive said rotating turntable in the reverse direction and at a low speed, light source means for directing a light beam to the central zone of transparent vessel being rotated at a low speed, photo-inspection means disposed alongside the vessel for catching the rays of light irregularly reflected by any foreign solid matters that may be present in the liquid, and discharging means associated with the photo-inspection means for separately discharging the conforming and non-conforming vessels discriminated upon the degree of existing objectionable foreign solid matters.

3. A method for automatically sorting the transparent vessels containing a liquid depending upon the number and/or sizes of objectionable foreign solid matters that may be present in said liquid, comprising irradiating the liquid of each vessel under rotation with a light beam, leading the reflected rays of light from the irradiated solid matters to an optical pickup tube, passing the output from the pickup tube through an electronic circuit to provide shaped definite pulse signals, counting the number of pulse signals corresponding to the number and/or sizes of the foreign solid matters by signal-counting circuit means, and permitting only the certain counted values in excess of predetermined numerical value to produce output current, thereby exciting electrical and mechanical devices to open selectively the passage of the conforming and non-conforming vessels discriminated upon the degree of the existing objectionable foreign solid matters.

4. Automatic liquid inspection apparatus, comprising feed means for successively feeding rotatable transparent vessels filled with a liquid and automatically rearranging the vessels in such manner as to feed them one by one, slowly rotating turret means having a multiplicity of turntables arranged along the periphery of turret, said turntables being adapted to receive said transparent vessels which are intermittently or successively fed in from the feed means, drive means for rotating said turntables at a high-speed in one direction while said turret is rotating, drive means located next said high-speed driving means and adapted to drive turntables one by one in the reverse direction and at a low speed, light source means for directing a light beam to the central zone of the respective vessels while being rotated at the low speed, means for leading the reflected rays of the light from any undesired foreign solid matters that may be present in the liquid in the respective vessels into an optical pickup tube, electronic circuit for changing the output of the pickup tube to shaped definite pulse signals, circuit means for counting the number of pulse signals relative to the number and/or sizes of the foreign solid matters in the liquid, and means for permitting only the certain counted values of the signals in excess of predetermined numerical value to produce output thereby exciting electrical and mechanical devices to open selectively the passage of the conforming and non-conforming vessels discriminated upon the degree of the existing objectionable foreign solid matters.

References Cited

UNITED STATES PATENTS

| | | | |
|---|---|---|---|
| 2,633,772 | 4/1953 | Brown et al. | 356—197 |
| 3,020,033 | 2/1962 | McCreanor et al. | |
| 3,217,877 | 11/1965 | Honjyo et al. | 356—197 X |
| 3,412,254 | 11/1968 | Doering et al. | 235—92 |

ALLEN N. KNOWLES, Primary Examiner

U.S. Cl. X.R.

209—111.7; 235—92; 356—197; 259—81